United States Patent [19]

Kettenring

[11] 4,395,650
[45] Jul. 26, 1983

[54] ELECTROMAGNETIC DIAPHRAGM DISK ACTUATOR

[75] Inventor: Günther Kettenring, Freising, Fed. Rep. of Germany

[73] Assignee: Max-Planck-Gesellschaft zur Forderung, Gottingen, Fed. Rep. of Germany

[21] Appl. No.: 252,610

[22] Filed: Apr. 9, 1981

[30] Foreign Application Priority Data

Apr. 25, 1980 [DE] Fed. Rep. of Germany ....... 3016126

[51] Int. Cl.³ ............................................. H02K 7/10
[52] U.S. Cl. ......................................... 310/82; 74/800
[58] Field of Search .................... 74/640, 750 R, 800, 74/804, 805; 310/82, 83

[56] References Cited

U.S. PATENT DOCUMENTS

| | | | |
|---|---|---|---|
| 2,849,897 | 9/1958 | Walma | 74/800 |
| 3,492,515 | 1/1970 | Foskett | 310/82 |
| 3,525,890 | 8/1970 | Buchanan, Jr. | 310/82 |
| 3,530,742 | 9/1970 | Sfredda | 74/805 |
| 4,081,702 | 3/1978 | Neumann | 310/49 R |

FOREIGN PATENT DOCUMENTS 994144 6/1965 United Kingdom ................. 310/82

Primary Examiner—J. D. Miller
Assistant Examiner—D. L. Rebsch
Attorney, Agent, or Firm—Cushman, Darby & Cushman

[57] ABSTRACT

An electromagnetic diaphragm disk actuator is both easily driven and positively held in its desired controllable relationship. The actuator includes a stator having a driving rim with a driving tooth system, a holding rim spaced axially away from the stator with a holding tooth system, a plurality of pairs of electromagnets in the stator and a rotor connected to a drive shaft having a magnetically attractable diaphragm with cooperating driving and holding tooth systems positioned around the circumferential edge and on opposite sides thereof lying between the stator and the holding rim. The diaphragm is positioned between the driving rim and holding rim such that the engagement points of the driving and holding tooth systems deform the diaphragm to the point that it develops an apex generally defined by the axis between the points of engagement of the holding tooth system and such axis is displaced 90° relative to the axis formed by the engagement points of the driving tooth systems. Relative movement is effected by successive excitation of electromagnet pairs.

23 Claims, 4 Drawing Figures

ELECTROMAGNETIC DIAPHRAGM DISK ACTUATOR

BACKGROUND OF THE PRESENT INVENTION

The present invention relates to an electromagnetic diaphragm disk actuator.

Actuators of the diaphragm disk type are particularly useful in an outer-space environment, such as in satellites or the like when, for example, an antenna must be adjusted by very small angles with high angular resolution. The number of electromagnet pairs which must be successively excited for each adjustment process is dependent upon the amount of control one desires to have over the adjustment regulation. In order to obtain a given regulating quantity, the electromagnet control has a storage system which stores, following the switching off of the electromagnets, the information relating to the particular electromagnet pairs which are to be excited first for the next regulating process, so that the start of the new regulating distance coincides with the end of the preceding regulating distance.

In a known diaphragm disk actuator (German Offenlegeungschrift No. 2,525,036) the diaphragm is constructed as a circular disk. The rotor is provided with an axial toothing or gear teeth on the side of its circumferential edge facing the electromagnets which corresponds to the axial toothing or gear teeth arrangement on the annular rolling path for the disk on the stator. The number of teeth between the axial toothings varies by an even number and the diaphragm is axially deflected by the simultaneous excitation of a pair of diametrically opposed electromagnets such that its teeth mesh with teeth in the rolling path at diametrically opposed locations. As a result of the stepwise excitation of successive pairs of electromagnets, the meshing points of the teeth travel in a circle leading to a relative rotation of the rotor with respect to the stator on the basis of the different numbers of teeth. However, as meshing only takes place upon exciting the electromagnets, there is no holding moment for the rotor when the electromagnets are deactivated. Consequently, there is an undesired adjustment of the rotor due to vibrations or accelerative forces as will occur upon launching of a rocket, which is not recorded by the electromagnet control store. Thus, regulating errors occur when the motor is activated.

Another known diaphragm disk actuator, in U.S. Pat. No. 4,081,702 (German Auslegeschrift No. 2,517,974), discloses that when the electromagnets are not excited, the engagement of the diaphragm holding teeth in the tooth holding rim produces a holding moment for preventing an undesired shifting of the rotor when the motor is switched off. According to this known actuator, the diaphragm is kept deformed to a cone-shaped shell under elastic pretensioning due to the position of the toothed holding rim. However, the diaphragm is driven by frictional resistance with the side of its circumferential edge remote from its holding teeth on the stator rolling path. Due to this rolling of the circumferential edge of the diaphragm on the rolling path in response to successive excitations of the electromagnet pairs, the meshing points between the holding teeth of the diaphragm and the toothed holding rim are respectively displaced by 90° relative to the diametrically opposed engagement points of the circumferential edge of the diaphragm on the rolling path in order to rotate with the engagement points in a shaft-like manner.

The necessary elastic dimensional changes of the circumferential edge of the diaphragm at the meshing points of its holding teeth with the toothed holding rim must be brought about at circumferential points displaced by 90° relative to these meshing points due to the elastic deflection of the circumferential edge of the diaphragm. The diaphragm circumferential edge must be made relatively rigid to achieve this effect with the conical shape of the diaphragm. This relative rigidity insures that the circumferential stresses which are present to a considerable degree in the diaphragm due to the conical pre-deformation are not increased to such an extent by the deflection of the circumferential edge that they lead to the bulging of the diaphragm, and consequently, to regulating errors. However, rigidity of the circumferential edge necessitates relatively powerful, and therefore, heavy electromagnets in order to effect local deflection of the circumferential edge of the diaphragm by the magnetic force.

Additionally, the operating moment or torque of this conventional motor is fundamentally determined by the rigidity or pretensioning force of the diaphragm because the force acts circumferentially via the tooth flank angle of the holding tooth system which produces the holding moment and the operating moment. The moment produced by the frictional resistance rolling of the diaphragm on the rolling path must be kept small. A high moment would result in slip occurring on each side of the diaphragm due to the unavoidable tolerances even with optimum adaptations of the thrust movements, which can lead to stepping errors. Thus, the operating moment of this conventional motor cannot be increased by a higher power expenditure.

SUMMARY OF THE PRESENT INVENTION

The present invention, however, solves the problem of providing an electromagnetic diaphragm disk actuator with a high holding moment when the electromagnets are deactivated, which permits a high stepping resolution with a powerful driving torque and high stepping frequency.

As a result of the deformation of the diaphragm to a shaped surface as proposed by the present invention, the diaphragm is significantly stiffened relative to a comparatively limited diaphragm thickness in the undeformed state. The resistance to the deformations at the particular engagement points of the holding teeth necessary for the rotation of the disk is correspondingly low, which advantageously permits high stepping frequencies and a high angular resolution. Thus, comparatively weak and, therefore, lightweight magnets are sufficient for step by step movement of the diaphragm.

The diaphragm tension forces occur at the engagement points of the diaphragm holding teeth. The deformation of the planar circular diaphragm disk to a shaped surface by forces acting symmetrically to the connecting line of the engagement points of the holding teeth and perpendicular to the diaphragm plane causes the holding teeth of the diaphragm to be forceably engaged with the holding teeth of the holding rim. This effect occurs even with the limited deformations which are produced when the electromagnets are not excited since the different numbers of teeth causes a riding-on of the tips of the teeth. This riding-on effect occurs at a distance from the engagement points of the holding teeth at approximately those circumferential points on either side of the engagement points, which are relatively displaced by 45°. Since the elastic deformation of the diaphragm to a shaped surface also occurs with deactivated electromagnets, a comparatively high holding moment for the rotor is obtained even with a highly flexible diaphragm, although to a lesser extent than in an operating state.

During the step by step movement of the diaphragm through the excitations of the electromagnet pairs taking place successively in a circular manner, the shaped surface of the diaphragm at the circumferential edge and substantially the entire diaphragm material up to its center contributes to the transmission of the deformation stresses from the engagement points of the driving teeth to the engagement points of the holding teeth relatively displaced by 90°. As a result, the holding teeth can rotate cleanly and synchronously with the engagement points of the driving teeth. Due to this meshing of the diaphragm with two identical toothed rims at all four meshing points, the possible stepping precision is increased with a high stepping resolution for extremely small angular adjustments and a possibly high stepping frequency. The driving torque is substantially determined by the rolling of the driving teeth, and, to the same extent, the rolling of the holding teeth. Thus, a high driving torque can additionally be obtained.

The driving torque is substantially determined by the size of the acting magnetic forces due to diaphragm meshing on two sides and its deformation to a shaped surface, so that the driving torque magnitude is a dependent upon the electrical power level supplied to the electromagnets. Thus, the present invention leads to the additional advantage that, in the event of an emergency, such as, when the rotor or the device coupled to its driven shaft seizes for some reason, it is possible through a pulse-like excitation of the electromagnets with high electrical power to produce a high torque which overcomes the seizing action. Relatively high torques can be briefly produced due to the stiffening of the rotor through its deformation to a shaped surface so that the regulating process can be performed.

BRIEF DESCRIPTION OF THE DRAWINGS

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures wherein:

DETAILED DESCRIPTION OF THE INVENTION

Figure 1:
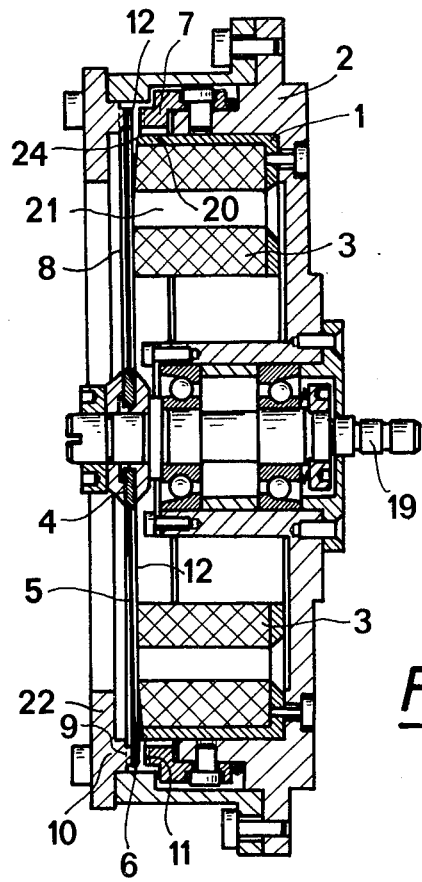
FIG. 1 is a cross-sectional view through a diaphragm disk actuator along line 13, 14 of FIG. 3 according to the present invention, with some parts shown in elevation for clarity.

The preferred exemplary embodiment of a diaphragm disk actuator according to the present invention as shown in FIG. 1 has a stator 1 supported within a cup-shaped stator casing 2. An even number of electromagnets 3 are circularly arranged in casing 2 so that with each electromagnet 3 there is another associated paired electromagnet diametrically facing the stator 1, with which it is simultaneously excited. Thus, a plurality of electromagnet pairs are arranged about a common point and within casing 2. A rotor, generally indicated at 4, includes a disk-shaped diaphragm 5 of magnetically conductive material and is keyed onto the driven shaft 19 coaxially to the stator 1 and is rotatably supported within casing 2.

Diaphragm 5 is elastically deformable from its fixing point on drive shaft 19 up to and including its circumferential edge 6. Diaphragm 5 has a driving tooth system 12 (a first gear tooth system) on the side of circumferential edge 6 facing the electromagnets 3. Similarly, on the side of the circumferential edge 6 opposite electromagnets 3, diaphragm 5 has a holding tooth system 8 (a second gear tooth system). A toothed driving rim 7 having driving teeth 11 (a third gear tooth system) is associated with the driving teeth 12 of the diaphragm 5 and is arranged on the terminal edge of the stator casing 2 facing the diaphragm 5 in such a way that when the electromagnets are not excited there is an axial gap between the driving teeth 12 of diaphragm 5 and the driving teeth 11 of the toothed driving rim 7.

Figure 3:
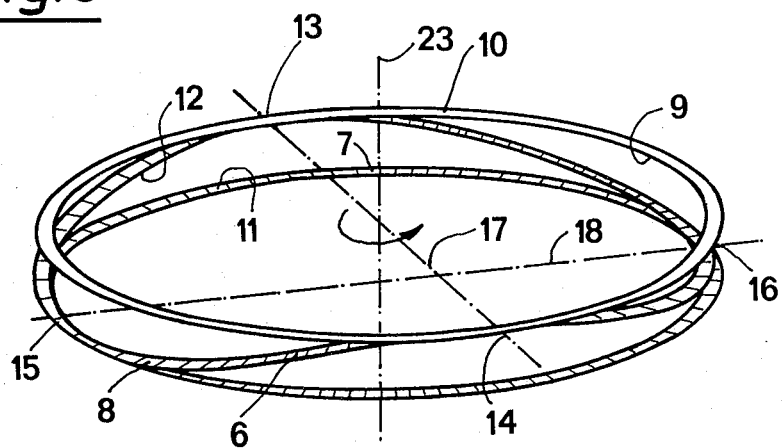
FIG. 3 depicts a diagrammatic perspective view of the operating principle of the actuator system of the present invention.
Figure 2:
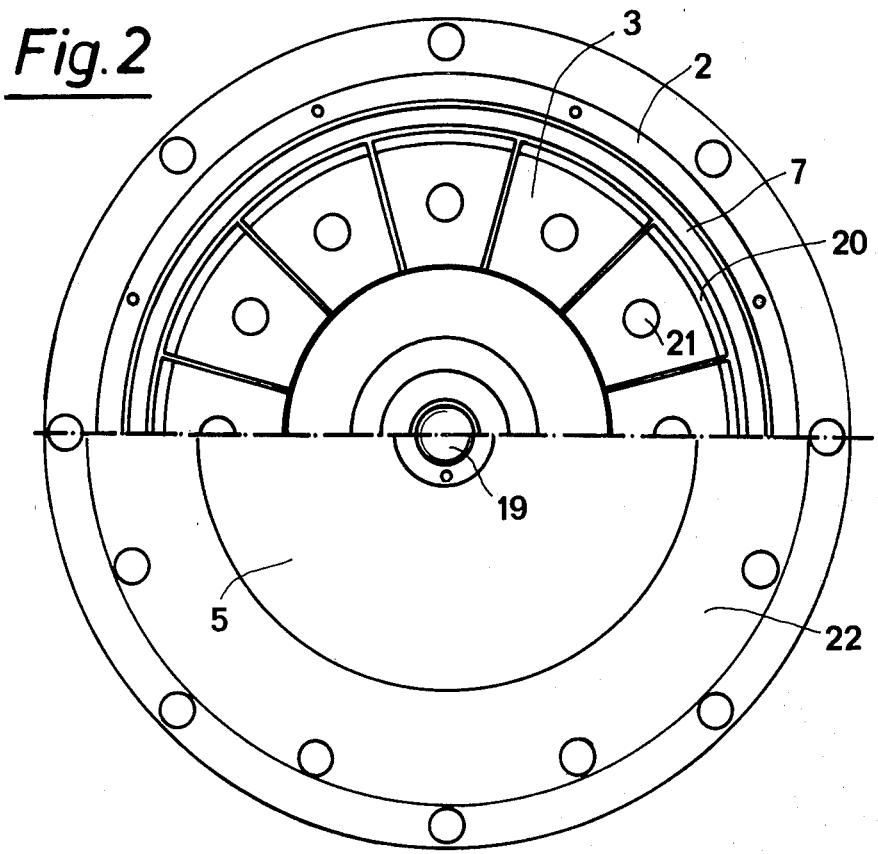
FIG. 2 depicts a plan view of the actuator of FIG. 1, the toothed holding rim and diaphragm being omitted in the upper half thereof and other parts being cut away for clarity.

An annular cover 22 is fixed to stator casing 2 on the side of diaphragm 5 remote from electromagnets 3. A toothed or geared holding rim 10 is formed about and on the inside of annular cover 22, which holding rim 10 has a holding tooth system 9 (a fourth gear tooth system), whose dimensions correspond to those of rim 7. As can be seen in FIG. 3, the holding tooth system 9 of the toothed holding rim 10 is associated with the holding tooth system 8 of the diaphragm 5. The dimensions of the diaphragm's driving tooth system 12 and holding tooth system 8 are generally identical and the number of teeth of each of the tooth systems 8 and 12 differ by an even number greater from those of the rim 10 and the rim 7. Thus, there can be complete meshing between the diaphragm holding tooth system 8 and holding tooth system 9 associated with rim 10 on the one hand as well as between diaphragm driving tooth system 12 and the driving tooth system 11 associated with rim 7 on the other at diametrically opposed engagement points.

Referring specifically to FIG. 3, the adjustable relative rotation position of rims 7 and 10 is preferably such that the engagement points 15, 16 of driving tooth system 11 of toothed driving rim 7 and the driving tooth system 12 of diaphragm 5 are displaced by 90° in any rotor rotation position with respect to the engagement points 13, 14 of the holding tooth system 9 of the toothed holding rim 10 and the holding tooth system 8 of the diaphragm 5. In this arrangement, the connecting line 17 extending between engagement points 13, 14 of tooth systems 8, 9 is perpendicular to the connecting line 18 extending between engagement points 15, 16 of tooth systems 11, 12.

The axial position of rotor 4 on driven shaft 19 is selected in such a way that diaphragm 5 with its holding tooth system 8 is forced under axial pretension against the holding tooth system 9 to develop a cylindrically shaped surface in the diaphragm, as shown in FIG. 3, so that both holding tooth systems 8 and 9 fully mesh at the two diametrically opposed engagement points 13, 14. As a result of the different numbers of teeth between tooth systems 8, 12 and 9, 11, respectively, the tooth tips of tooth systems 8, 9 engage with one another spaced from the engagement points 13, 14 so that diaphragm 5 is kept deformed to a slightly curved surface symmetrical to the connecting line 17 between the two points 13, 14. Thus, apex of diaphragm 5 in the deformed state extends along line 17 which also extends across and is defined by the top of the cylindrically shaped surface. If, upon operation, two diametrically opposed electromagnets 3 are excited which are displaced by 90° relative to the engagement points 13, 14 of the holding tooth systems 8, 9, the diaphragm 5 made from magnetically conductive material is magnetically attracted by these electromagnets. This magnetic attraction causes the driving tooth system 12 to become fully meshed with the driving tooth system 11 of the toothed driving rim 7 at engagement points 15, 16 displaced by 90° corresponding to engagement points 13, 14 of tooth systems 8, 9. Thus, in accordance with FIG. 3, the diaphragm is deformed to a more pronounced cylindrically shaped surface whose apex line coincides with the connecting line 17 of engagement points 13, 14 of holding tooth systems 8, 9.

Electromagnets 3 have two pole shanks 20, 21, wherein one shank 21 is surrounded as a core by the magnet coil and the other shank 20 is constructed as a plate-like cylindrical jacket segment and is radially arranged on the outer periphery of the electromagnets within the toothed driving rim 7. Optionally, rim 7 can be directly formed by providing corresponding frontally toothed pole shanks 20. The surface of the electromagnets facing diaphragm 5 is tapered in a direction away from diaphragm 5 towards rim 7, as shown in FIG. 1, so that the surfaces of all the electromagnets 3 of stator 1 form a frustum surface with which diaphragm 5 can engage according to the particular excitation of the electromagnet pairs.

The face of pole shanks 20, 21 of each of the associated particular magnets should come into direct contact with diaphragm 5, preferably without any residual air gap, so that the optimum magnetic force is used. The face of pole shank 20 can also be utilized as an engagement surface 24 for diaphragm 5 in such a way that when the teeth of driving tooth systems 11, 12 engage on one tooth flank pair, a fine clearance remains between the flanks of the other tooth flank pair. This prevents an interkeying of the driving tooth systems, even in the case of high magnetic forces, which permits trouble-free operation of the actuator without lubricating the tooth pairs.

If, in operation, the electromagnet pairs of diametrically opposed electromagnets 3 are circularly excited in a successive stepwise manner, diaphragm 5 with its driving tooth system 12 correspondingly rolls on the driving tooth system 11 of the toothed driving rim 7 and is deformed in a corresponding stepwise manner to new shaped surfaces whose apex line 17, as shown in FIG. 3, is perpendicular to the connecting line 18 of the engagement points 15, 16 of driving tooth systems 11, 12. Thus, the engagement points 13, 14 of holding tooth system 8, 9 can rotate about the rotor axis 23 in accordance with engagement points 15, 16 of driving tooth systems 11, 12 in response to the varying diaphragm stresses.

There is an angular adjustment of rotor 4 and, consequently, of driven shaft 19 relative to stator 1 due to the different number of teeth between tooth systems 8, 12 and 9, 11, respectively. Additionally, in response to diaphragm stresses resulting from its structural deformation, the circumference points of the diaphragm on the apex line 17 are radially displaced somewhat towards the outside of its curvature with respect to the diaphragm surface. Thus, the holding tooth system 8, 9 are pressed into one another at their engagement points 13, 14, whereas the driving tooth systems 11, 12 are magnetically drawn into one another at their engagement points 15, 16. Thus, a relatively high driving torque is transmitted to rotor 4 at the engagement points 13, 14 of the holding tooth systems 8, 9 and at the engagement points 15, 16 of the driving tooth systems 11, 12. In other words, the driving torque is transmitted at four points on the circumferential edge 6 of diaphragm 5 displaced by 90° about the rotor circumference. This torque varies with the magnetic force so that the driving torque of rotor 4 can be controlled by controlling the power applied to the electromagnets 3.

Diaphragm 5 also continues to assume a deformed surface shaped when the magnets are not excited, although the curvature is less during this holding state than the curvature occurring during the operating state. Thus, even in the holding state, the holding tooth system 8 of the diaphragm 5 is forced into the holding tooth system 9 of the toothed holding rim 10 at engagement points 13, 14 diametrically opposing one another with respect to the rotor along apex line 17 of the shaped surface due to the diaphragm stresses. Thus, with the magnets not excited, there is a holding moment for rotor 4 and in turn for drive shaft 19 which substantially corresponds to the diaphragm deformation resistance to a change in the position of the shaped surface formed by it. If this holding moment is exceeded as a result of external circumferential forces on rotor 4, there is no sliding-through of the latter with respect to the toothed holding rim 10. Instead, there is a clean rolling of the holding tooth system 8 of diaphragm 5 on the holding tooth system 9 of holding rim 10 thereby preventing any risk of damage to the teeth.

Figure 4:
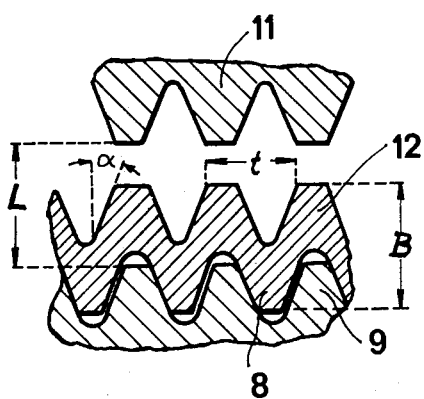
FIG. 4 depicts a partial cross-sectional view of the rotor teeth and the toothed stator rims of the disk actuator of FIG. 1 on a larger scale.

Referring to FIG. 4, a clean rolling movement of the circumferential edge 6 on the holding tooth system 9 of the toothed holding rim 10, accompanied by a corresponding re-deformation of diaphragm 5 to further identical shaped surfaces, even under the additional action of vibrations or accelerative forces acting axially on the diaphragm is forcibly obtained if the tooth tip spacing L between the tooth tips of the driving tooth system 11 and holding tooth system 9, of rims 7 and 10 respectively, is smaller than the tooth tip spacing B between the tooth tips of the holding tooth system 8 and the driving tooth system 12 of diaphragm 5. Thus, diaphragm 5 with its driving tooth system 12 will mesh with rim 7 at points displaced by 90° relative to the engagement points 13, 14 of the holding tooth systems 8 and 9 even if the driving tooth system 12 is not fully engaged with driving rim 7 in the holding state. Thus, with the actuator switched off, there is a complete meshing of the holding teeth systems 8 and 9 at their two diametrically opposed engagement points 13 and 14 and the driving tooth systems 11, 12 with reciprocal clearance at engagement points 15, 16 displaced by 90° relative to those of the holding tooth systems. The meshing of the holding tooth systems 8 and 9 occurs at the apex of the shaped surface of diaphragm 5 so that the desired holding moment is present and is essentially determined by the deformation resistance of diaphragm 5 at the apex of its shaped surface formed by it against a displacement of the apex on the diaphragm circumference.

Thus, in the case of powerful vibrations and the like, the simultaneous meshing of the driving tooth systems prevents any risk that there will be a reduction of the engagement depth of the holding tooth systems 8 and 9 at their engagement points 13 and 14 on the apex of the shaped diaphragm surface. In this manner, diaphragm 5 with its associated holding tooth systems is prevented from jumping completely out of its meshed engagement with the toothed holding rim 10 which would cause the sliding-through of the diaphragm. Instead, a clean rolling of the tooth systems occurs so that the teeth cannot be damaged. Furthermore, due to the simultaneous meshing of the holding tooth systems 8 and 9 and driving tooth systems 11 and 12 in the holding state, it is possible to compensate variations in the deformed diaphragm shape, particularly in the case of very fine tooth systems for a high stepping resolution. Otherwise, such variations could cause slippage due to excessive vibrations.

According to FIG. 4, the tooth systems can be constructed as straight tooth systems, whose flank angle preferably ranges between about 15° to about 20°. This angular range permits a significant increase in the holding moment and in the driving moment when compared with tooth systems having larger flank angles. As can be seen in FIG. 4, the holding tooth system 8 and driving tooth system 12 of diaphragm 5 preferably are circumferentially displaced from one another by up to half of the spatial distance (t) between each tooth so that one tooth of the tooth system on one side of the circumferential edge of the diaphragm generally coincides with a tooth gap of the tooth system on the other side. Consequently, the diaphragm in the vicinity of its teeth along its circumferential edge has the desirable property of high and uniform flexibility. As a result, it is also optionally possible to produce the tooth systems 8 and 12 on either side of the diaphragm in a single pressing process by meander-like or zig-zag deformation on the circumferential edge of the diaphragm.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope of the appended claims, which scope is to be accorded the broadest interpretation so as to encompass all such modifications and equivalent structures.

What I claim is:

1. An electromagnetic diaphragm actuator comprising of stator means for providing a driving force mounted in an outer housing, said stator means including a plurality of pairs of opposed electromagnets, an outer cover spaced outwardly from said stator means, a rotating shaft operatively connected to a deformable magnetic actuator diaphragm rotatably positioned between said stator and said outer cover, said diaphragm including first and second gear teeth systems respectively positioned on opposite sides and extending about the periphery thereof, corresponding third and fourth gear teeth systems substantially opposing one another, respectively positioned about said stator and electromagnets and about the interior periphery of said outer cover, the spacing between said third and fourth gear teeth systems being such that said diaphragm is tensioned therebetween and formed to develop a cylindrical surface therein, said first and second gear teeth systems each respectively engaging said third and fourth gear teeth systems, each at two diametrically opposed positions, with said first and third engaging positions being radially displaced about 90° with respect to said second and fourth engaging positions so that said diaphragm remains engaged with said third and fourth gear teeth systems.

2. A diaphragm disk actuator as in claim 1, wherein each tooth of said fourth and second gear teeth systems and said third and first gear teeth systems have a predetermined angle of pitch and a predetermined spatial distance between tooth tips.

3. A diaphragm disk actuator as in claim 2, wherein said second gear teeth system and said first gear teeth system of said diaphragm are circumferentially displaced relative to one another by a distance of not greater than about one-half of said spatial distance between tooth tips so that each tooth of said second gear teeth system generally coincides with a tooth gap between each tooth of said first gear teeth system.

4. A diaphragm disk actuator as in claim 3 wherein the axial space between the tooth tips of said third gear teeth system and said fourth gear teeth system is less than the axial distance between the tooth tips of said first gear teeth system and said second gear teeth system.

5. A diaphragm disk actuator as in claim 4 wherein said angle of pitch of each tooth of said second and fourth gear teeth systems and said first and third gear teeth systems is between about 15° to 20°.

6. A diaphragm disk actuator as in claims 1, 3, 4, or 5 wherein said stator further comprises an annular member defining a bearing surface in coaxial arrangement with said third gear teeth system so that said bearing surface will cooperate with a portion of said diaphragm to limit the mutual engagement depth of said first and third gear teeth systems.

7. A diaphragm disk actuator as in claims 1, 3, or 4 wherein said angle of pitch of each tooth of said second and fourth gear teeth systems and said first and third gear teeth systems is between about 15° to 20°.

8. A diaphragm disk actuator according to claim 1 wherein the axial space between the tooth lips of said third gear teeth system and said fourth gear teeth system is less than the axial distance between the tooth tips of said first gear teeth system and said second gear teeth system.

9. A diaphragm disk actuator according to claim 7 wherein said stator further comprises an annular member defining a bearing surface in coaxial arrangement with said third gear teeth system so that said bearing surface will cooperate with a portion of said diaphragm to limit the mutual engagement depth of said first and third gear teeth systems.

10. A diaphragm disk actuator as in claim 8 wherein said angle of pitch of each tooth of said second and fourth gear teeth systems and said first and third gear teeth systems is between about 15° to 20°.

11. A diaphragm disk actuator comprising:
a stator member including a stator housing and a plurality of pairs of opposed electromagnets, first track means fixedly attached to said stator member for providing a first portion of a rolling path, and second track means, for providing a second portion of said rolling path, fixedly attached to said stator member and spaced outwardly from said first track means so as to define a predetermined space therebetween; and a rotor means for communicating coaxial rotatable movement to a shaft member, said rotor means including an elastically deformable diaphragm member comprising a magnetically conductive material having a circumferential edge defining on one side thereof first engagement means for locally engaging with said first track means at a first pair of localized, diametrically opposed engagement points and a second engagement means on the other side thereof for locally engaging with said second track means at a second pair of localized, diametrically opposed engagement points, said first and second pair of engagement points being radially displaced about 90° on said circumferential edge, said diaphragm member being elastically deformed when in position between said first and second track means so as to define a tensioned cylindrically shaped surface extending between said second pair of engagement points, so that said diaphragm is coaxially rollable between said first and second track means upon said rolling path as pairs of electromagnets are sequentially energized and held in place when said electromagnets are de-energized.

12. A disk actuator as in claim 11 wherein said stator further includes an even numbered plurality of electromagnets circularly arranged in said stator housing.

13. A disk actuator as in claims 11 or 12 wherein said first and second track means include a first driving tooth system and a first holding tooth systems, respectively.

14. A disk actuator as in claim 13 wherein said first driving and first holding tooth systems include a predetermined number of teeth so that said predetermined number of teeth of said first driving tooth system equals said predetermined number of teeth of said first holding tooth system.

15. A disk actuator as in claim 14 wherein said first and second engaging means include a second driving tooth system and a second holding tooth system, respectively.

16. A disk actuator as in claim 15 wherein said second driving and second holding tooth systems include a predetermined number of teeth so that said predetermined number of teeth of said second driving tooth system equals said predetermined number of teeth of said second holding tooth system.

17. A disk actuator as in claim 16 wherein said predetermined number of teeth of said second driving and said second holding tooth systems is an even number greater than said predetermined number of teeth of said first driving and said first holding tooth systems.

18. A disk actuator as in claim 17 wherein each tooth of said first and second holding tooth systems and said first and second driving tooth systems have a predetermined angle of pitch and a predetermined spatial distance between tooth tips.

19. A disk actuator as in claim 18 wherein said second holding tooth system and said second driving tooth system of said diaphragm are circumferentially displaced relative to one another by a distance of not greater than about one-half of said spatial distance between tooth tips so that each tooth of said second holding tooth system generally coincides with a tooth gap between each tooth of said second driving tooth system.

20. A disk actuator as in claim 19 wherein the axial space between the tooth tips of said first driving tooth system and said first holding tooth system is less than the axial distance between the tooth tips of said second driving tooth system and said second holding tooth system.

21. A disk actuator as in claim 20 wherein said angle of pitch of each tooth of said first and second holding tooth systems and said first and second driving tooth systems are between about 15° to about 20°.

22. An electromagnetic diaphragm actuator as in claim 1 wherein said first and third gear teeth systems comprise the driving tooth system for said actuator and said second and fourth gear teeth systems comprise the holding tooth system for said actuator.

23. An electromagnetic diaphragm actuator as in claim 1 wherein the number of teeth in said first and second gear teeth systems differ by an even number greater than the number of teeth in said third and fourth gear teeth systems.

* * * * *

UNITED STATES PATENT AND TRADEMARK OFFICE
CERTIFICATE OF CORRECTION

PATENT NO. : 4,395,650
DATED : July 26, 1983
INVENTOR(S) : Gunther Kettenring

It is certified that error appears in the above-identified patent and that said Letters Patent are hereby corrected as shown below:

The correct name of the Assignee is "Max-Planck-Gesellschaft zur Förderung der Wissenschaften e.V.".

Signed and Sealed this

Twenty-fifth Day of September 1984

[SEAL]

*Attest:*

*Attesting Officer*

GERALD J. MOSSINGHOFF
*Commissioner of Patents and Trademarks*